F. M. ALLEN.
PROCESS OF GASSING LIQUORS WITH SO₂.
APPLICATION FILED APR. 29, 1920.
1,422,327.
Patented July 11, 1922.
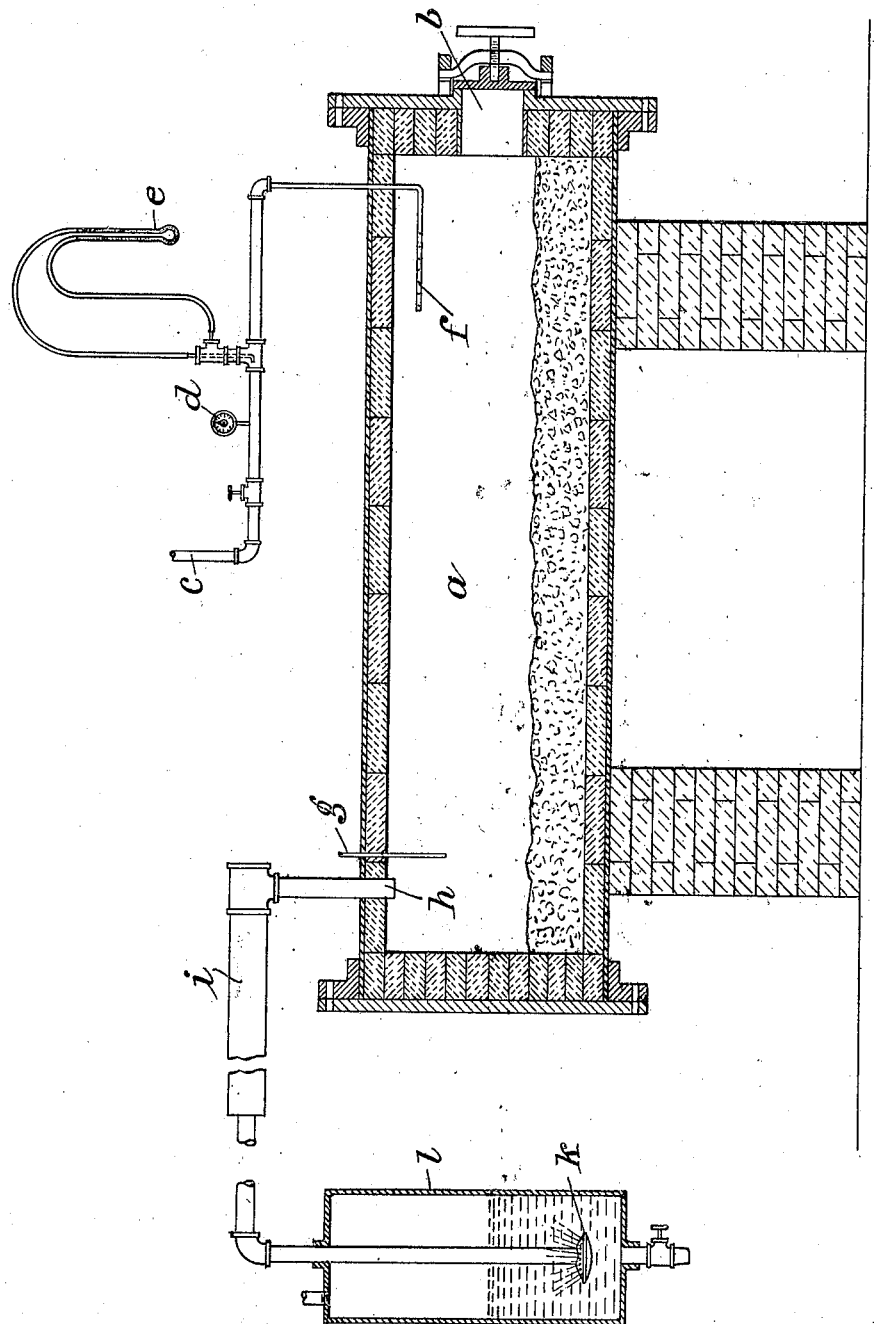
WITNESSES
INVENTOR
FRANK M. ALLEN
BY
ATTORNEYS.

UNITED STATES PATENT OFFICE.

FRANK MORRISON ALLEN, OF RIDLEY PARK, PENNSYLVANIA, ASSIGNOR TO GENERAL CHEMICAL COMPANY, OF NEW YORK, N. Y., A CORPORATION OF NEW YORK.

PROCESS OF GASSING LIQUORS WITH $SO_2$.

1,422,327.  Specification of Letters Patent.  Patented July 11, 1922.

Application filed April 29, 1920. Serial No. 377,703.

*To all whom it may concern:*

Be it known that I, FRANK MORRISON ALLEN, a citizen of the United States, and resident of Ridley Park, Pennsylvania, have invented certain new and useful Improvements in Processes of Gassing Liquors with $SO_2$, of which the following is a specification.

The invention relates to a process of supplying $SO_2$ for such industrial uses requiring relatively small amounts of the gas at relatively low pressures and the object of the invention is to provide an economic substitute for the use of liquid $SO_2$ and of rendering any plant requiring relatively small quantities of $SO_2$ at low pressures independent of a plant in which the production of $SO_2$ by itself is an object of importance.

As a particular illustration of a process in which this invention is of advantage, reference may be made to a plant producing sulfate of aluminum liquors. Such liquors require to be treated with $SO_2$ gas and the amounts of $SO_2$ employed are, relatively speaking, small, and such $SO_2$ supply need be under no greater pressure than that necessary to drive it through the liquor; three hundred pounds of gas per day at a pressure of eight pounds per square inch are sufficient for a relatively large daily production of sulfate of alumina. In a plant engaged in such operations, the result may be obtained by the use of liquefied $SO_2$. This is not only more expensive than this invention but the plant is made dependent upon additional, timely and proper deliveries from the outside. Even where such a plant requiring small amounts of $SO_2$ is located relatively near a chemical plant regularly producing $SO_2$ gas in large amounts and of high strength, the difficulties of tapping such a supply and properly propelling and controlling the same entail a lack of economy when compared with the process of this application, and in addition thereto will at best be applicable only where the plant requiring the relatively small quantities of $SO_2$ is located quite near another chemical plant producing large quantities of $SO_2$. It is to provide an economical, efficient, reliable, simple process requiring a minimum amount of space for the apparatus involved that the present invention was developed.

The process is preferably carried out in apparatus illustrated in the accompanying drawing. In that drawing $a$ indicates a retort of relatively small dimensions lined with fire brick. Illustrative dimensions for this retort may be given as a cylinder 14 feet long and 2 feet in diameter. Periodically, say for example twice a day, sulfur is introduced into this retort $a$ through the aperture $b$ and the ignition of this sulfur produces the $SO_2$ gas which is required. Air under pressure is introduced through the pipe $c$ which is provided with an air gauge $d$ and a Pitot gauge $e$. The air supply line terminates in a tubular elbow $f$ closed at its end having small holes drilled in the side thereof. The flow of air is regulated by the gauge $e$ which indicates velocity independent of pressure. When in full operation about a half inch water differential is carried on this gauge. By this means the temperature as indicated by the thermometer $g$ can be very easily and simply controlled. The retort or sulfur burner operates under an eight pound back pressure and at 550° F. gives a constant 8% $SO_2$ gas. The temperature at the outlet $h$ is not permitted to rise above 550° F. This prevents sulfur sublimation almost entirely and obviates the necessity of a secondary air supply or combustion chambers which are very difficult to control and tricky in their operation in burners of such small dimensions. The temperature or rate of burning is, of course, controlled by the amount of air furnished and this is stated as controlled by the gauge $e$.

In order to secure the requisite amount of agitation and mixing of air and gas in the retort $a$, the air by reason of the lateral apertures of the pipe $f$ is driven against the upper side of the burner in a tangential direction, thereby starting a circular rotary motion over the bed of the retort and causing a helical swirling motion over the molten sulfur. The 8% $SO_2$ gas which leaves the retort at $h$ passes into a pipe $i$ which, for example, may be a pipe 12 feet long and 6 inch diameter and which is filled with granulated coke. The provision of this coke filter is a precaution to guard against sublimed sulfur in case the temperature should accidentally rise too high. The filter also condenses and catches moisture and weak acid which is formed, thus preserving the iron gasolines. The gas, after passing through the filter $i$, is introduced into the liquor to be treated as shown at $k$.

The burner having the dimensions given is charged twice in 24 hours and burns about 150 pounds of sulfur per day. The burner is never permitted to get cold but, should this condition arise, the fire can be easily started with a piece of oily waste. Experience has shown that the only labor required to operate this burner, given a source of compressed air and exclusive of charging twice a day and cleaning the filter twice a month, is an inspection of the air valve to maintain the temperature to a standard 550° F. It will be observed that the apparatus used in connection with this process is of extreme simplicity and occupies very little room. It will also be observed that according to this process the air is not only relied upon to maintain temperatures but also to act as a mix-up for the gases in the retort and additionally to force the gas through the liquid in the vessel $l$. This is made conveniently possible by the relatively small dimensions of the apparatus. The retort $a$ may be regarded as an enlargement of the communication in the system beginning with the compressed air line $c$ and ending in the nozzle $k$.

What I claim is:

1. The process of gassing liquors with $SO_2$ which comprises introducing air under pressure not greatly above atmospheric pressure into a relatively small chamber containing molten sulfur and by controlling the velocity of the incoming air maintaining the temperature of the mixed gases moving from the chamber at approximately 550° F. and then introducing the mixed gases into a body of liquid, the dimensions of the chamber plus all air and gas conduits being such that the gases moving from the chamber are propelled with sufficient force to enable them to overcome the resistance of the liquor into which they are subsequently introduced.

2. The process of gassing liquors with $SO_2$ which comprises introducing air under pressure not greatly above atmospheric pressure into a relatively small chamber containing molten sulfur and by controlling the velocity of the incoming air maintaining the composition of the mixed gases moving from the chamber at approximately 8% $SO_2$ gas by volume and then introducing the mixed gases into a body of liquid, the dimensions of the chamber plus all air and gas conduits being such that the gases moving from the chamber are propelled with sufficient force to enable them to overcome the resistance of the liquor into which they are subsequently introduced.

3. The process of gassing liquors with a gas mixture containing $SO_2$ which comprises introducing air under pressure not greatly above atmospheric pressure into a chamber containing molten sulfur, introducing the produced gases into a volume of liquor, and so restricting the size of said chamber and all conduits that the air introduced may move the gases therethrough with sufficient reserve force that the gases pass through the volume of liquor and, by controlling the velocity of the incoming air, maintaining the temperature of the mixed gases moving from the chamber at approximately 550° F. and the composition of the mixed gases at approximately 8% $SO_2$ gas.

In testimony whereof I have hereunto set my hand.

FRANK MORRISON ALLEN.